US012442229B2

(12) United States Patent
Fuchs et al.

(10) Patent No.: US 12,442,229 B2
(45) Date of Patent: Oct. 14, 2025

(54) DOOR GAP LOCK

(71) Applicant: Siemens Mobility Austria GmbH, Vienna (AT)

(72) Inventors: Werner Fuchs, Lannach (AT); Roland Heggemann, Erfinder verstorben (DE); Johannes Windhager, Södingberg (AT)

(73) Assignee: Siemens Mobility Austria GmbH, Vienna (AT)

( * ) Notice: Subject to any disclaimer, the term of this patent is extended or adjusted under 35 U.S.C. 154(b) by 135 days.

(21) Appl. No.: 18/267,211

(22) PCT Filed: Dec. 16, 2021

(86) PCT No.: PCT/EP2021/086313

§ 371 (c)(1),
(2) Date: Jun. 14, 2023

(87) PCT Pub. No.: WO2022/129414

PCT Pub. Date: Jun. 23, 2022

(65) Prior Publication Data

US 2024/0011340 A1 Jan. 11, 2024

(30) Foreign Application Priority Data

Dec. 18, 2020 (AT) .............................. A 51114/2020

(51) Int. Cl.
*E05C 17/16* (2006.01)
*E05B 17/00* (2006.01)

(52) U.S. Cl.
CPC ........ *E05C 17/166* (2013.01); *E05B 17/0062* (2013.01)

(58) Field of Classification Search
CPC ............. E05B 17/0062; E05B 65/0032; E05C 17/166; Y10T 292/28; Y10T 292/34;
(Continued)

(56) References Cited

U.S. PATENT DOCUMENTS 251,732 A 1/1882 Phillips
388,074 A * 8/1888 Reardon et al. ...... E05C 17/166 292/269
(Continued)

FOREIGN PATENT DOCUMENTS

CA 2287683 A1 * 4/2000 ......... E05B 63/0069
DE 637720 11/1936
(Continued)

OTHER PUBLICATIONS

EP0964121 Espacenet machine translation claims and description (Year: 2024).*
(Continued)

*Primary Examiner* — Kristina R Fulton
*Assistant Examiner* — Steven A Tullia
(74) *Attorney, Agent, or Firm* — Cozen O'Connor

(57) ABSTRACT

A door gap lock includes a door leaf part that is configured to be arranged on a door leaf and that has an axially slidably mounted locking bolt, and includes a frame part that is configured to be arranged on a door frame and has a rotatably mounted pivot lever, where the locking bolt can be slid into a guide on the pivot lever and, during a relative movement between the door leaf part and the frame part, the locking bolt is guided in a form-fitting manner in the guide so as to be slidable therein over a defined distance, and where the guide when arranged in the pivot lever has a predetermined breaking point at which the locking bolt breaks through the guide when a defined force is applied to the locking bolt.

7 Claims, 3 Drawing Sheets

(58) Field of Classification Search
CPC .. Y10T 292/37; Y10T 292/243; Y10S 292/51; Y10S 292/55
See application file for complete search history.

(56) References Cited

U.S. PATENT DOCUMENTS

| | | | | | | |
|---|---|---|---|---|---|---|
| 984,612 | A | * | 2/1911 | Spangler | E05C 17/166 292/269 |
| 1,029,693 | A | * | 6/1912 | Klein | E05C 17/32 292/263 |
| 1,524,088 | A | * | 1/1925 | Ernst | E05C 17/166 292/269 |
| 1,596,183 | A | * | 8/1926 | Horlick, Jr. | E05C 17/166 292/270 |
| 1,673,189 | A | * | 6/1928 | Frank | E05C 17/166 292/268 |
| 2,030,916 | A | * | 2/1936 | Gard | E05C 17/166 292/269 |
| 2,200,627 | A | * | 5/1940 | Levy | E05C 17/30 292/262 |
| 2,505,320 | A | * | 4/1950 | Bernhard | E05C 17/166 292/269 |
| 2,919,945 | A | * | 1/1960 | Tannen | E05C 17/166 292/262 |
| 3,387,875 | A | * | 6/1968 | White | E05C 17/30 292/262 |
| 3,801,143 | A | * | 4/1974 | Gutner | E05C 19/06 292/76 |
| 3,869,886 | A | * | 3/1975 | Diaz | E05C 17/04 292/262 |
| 3,924,885 | A | * | 12/1975 | Markovitch | E05B 17/2003 292/262 |
| 3,924,886 | A | * | 12/1975 | Markovitch | E05C 17/04 70/93 |
| 3,924,887 | A | * | 12/1975 | Markovitch | E05C 17/32 292/283 |
| 4,017,104 | A | * | 4/1977 | Walker | E05C 19/003 292/259 R |
| 4,174,861 | A | * | 11/1979 | Drake | E05C 17/166 70/93 |
| 4,178,783 | A | * | 12/1979 | Lee | E05B 17/0062 70/422 |
| 4,226,453 | A | * | 10/1980 | Robertson | E05C 17/166 292/268 |
| 4,436,331 | A | * | 3/1984 | Glickman | E05C 17/166 292/270 |
| 4,684,159 | A | * | 8/1987 | Hutter | E05C 17/166 292/268 |
| 4,711,479 | A | * | 12/1987 | Grandinetti | E05C 17/28 292/272 |
| 4,846,514 | A | * | 7/1989 | Flynn | E05C 17/166 292/268 |
| 5,018,415 | A | * | 5/1991 | Hawley | E05B 19/20 81/488 |
| 5,244,240 | A | * | 9/1993 | Nordmeyer | E05B 63/0017 292/263 |
| 5,244,273 | A | * | 9/1993 | Kaspar | F25D 23/028 312/405 |
| 5,381,628 | A | * | 1/1995 | D'Hooge | E05C 17/30 16/49 |
| 5,992,100 | A | * | 11/1999 | Sidney | E06B 1/18 49/505 |
| 6,145,351 | A | * | 11/2000 | Levenson | E05B 45/06 70/93 |
| 6,866,309 | B1 | * | 3/2005 | Marks | E05C 17/24 292/DIG. 53 |
| 8,783,740 | B1 | * | 7/2014 | Hurt | E05C 17/18 292/270 |
| 8,959,960 | B2 | * | 2/2015 | Hill | D06F 39/12 68/3 R |
| 10,975,602 | B2 | | 4/2021 | Kingsbury | |
| 11,591,836 | B1 | * | 2/2023 | Johnson | E05C 17/30 |
| 2006/0214435 | A1 | * | 9/2006 | Swink | E05C 17/50 292/262 |
| 2007/0029817 | A1 | * | 2/2007 | Svensson | E05C 17/30 292/262 |
| 2017/0356220 | A1 | * | 12/2017 | Robinson | E05C 9/002 |
| 2018/0163445 | A1 | | 6/2018 | Kingsbury | |

FOREIGN PATENT DOCUMENTS

| | | | | | |
|---|---|---|---|---|---|
| DE | 3408917 | C2 | * | 4/1989 | E05C 17/166 |
| DE | 9100930 | | | 4/1991 | |
| DE | 4200868 | A1 | * | 7/1992 | E05C 1/06 |
| DE | 19923433 | A1 | * | 11/2000 | E05C 9/021 |
| DE | 10006005 | | | 8/2001 | |
| DE | 10142558 | | | 4/2003 | |
| DE | 102013203488 | A1 | * | 9/2014 | E05C 17/16 |
| DE | 102018200404 | A1 | * | 7/2019 | E05B 17/0004 |
| DK | 146659 | B | * | 11/1983 | E05C 17/166 |
| EP | 0204991 | A2 | * | 12/1986 | E05C 17/24 |
| EP | 0351345 | A1 | * | 1/1990 | E05C 17/30 |
| EP | 0964121 | A1 | * | 12/1999 | E05B 45/086 |
| EP | 2772604 | | | 9/2014 | |
| EP | 3141681 | B1 | * | 10/2018 | E05C 17/166 |
| ES | 2277494 | A1 | * | 7/2007 | E05C 17/166 |
| FR | 2739892 | A1 | * | 4/1997 | E05C 17/166 |
| GB | 223108 | A | * | 10/1924 | E05C 17/16 |
| GB | 1088161 | A | * | 10/1967 | E05C 17/16 |
| GB | 2173246 | A | * | 10/1986 | E05C 17/166 |
| GB | 2251264 | A | * | 7/1992 | E05B 65/0811 |
| GB | 2288433 | A | * | 10/1995 | E05C 17/166 |
| GB | 2292970 | A | * | 3/1996 | E05C 17/166 |
| GB | 2346923 | A | * | 8/2000 | E05C 17/166 |
| GB | 2357549 | A | * | 6/2001 | E05C 17/166 |
| JP | H06317059 | A | * | 11/1994 | E05C 17/06 |
| JP | 2000291303 | A | * | 10/2000 | E05B 63/14 |
| JP | 3200767 | B2 | * | 8/2001 | E05C 17/06 |
| JP | 2002227486 | A | * | 8/2002 | E05B 65/06 |
| JP | 4138218 | B2 | * | 8/2008 | E05C 17/06 |
| KR | 200313415 | Y1 | * | 5/2003 | E05C 17/20 |
| KR | 20100007589 | U | * | 7/2010 | E05C 17/16 |
| KR | 101091801 | B1 | * | 12/2011 | E05C 17/04 |
| KR | 20120134781 | A | * | 12/2012 | E05B 65/0042 |
| KR | 101271536 | B1 | * | 6/2013 | E05C 17/02 |
| KR | 20130104344 | A | * | 9/2013 | E05B 65/06 |
| NL | 2014770 | A | * | 11/2016 | E05C 17/045 |
| NZ | 198659 | A | * | 10/1985 | E05C 17/365 |
| WO | WO-2004090269 | A1 | * | 10/2004 | E05C 17/166 |
| WO | WO-2018206307 | A1 | * | 11/2018 | E05B 17/2084 |

OTHER PUBLICATIONS

PCT International Search Report dated May 4, 2022 based on PCT/EP2021/086313 filled Dec. 16, 2021.

* cited by examiner

DOOR GAP LOCK

CROSS-REFERENCE TO RELATED APPLICATIONS

This is a U.S. national stage of application No. PCT/EP2021/086313 filed 16 Dec. 2021. Priority is claimed on Austrian Application No. A51114/2020 filed 18 Dec. 2020, the content of which is incorporated herein by reference in its entirety.

BACKGROUND OF THE INVENTION

1. Field of the Invention

The invention relates to door locks and, more particularly, a door gap lock.

2. Description of the Related Art

Door gap locks are used to block an unlocked door at a specific small opening angle so that it cannot be fully opened. Such door gap locks are widely used on entry doors to homes to enhance security, because intrusion into the home is prevented by them when an owner opens the door unintentionally. A door gap lock generally comprises a pivot lever connected to the door frame for pivotable movement and a pin projecting from the door leaf. If the function of the door gap lock is required, then the pivot lever is to be moved into a specific position before the door is opened, in which the pin engages in a recess on the pivot lever. If the door is then opened it can only be opened by the amount predetermined by the recess. Door gap locks are designed so that they can only be unlocked from one side of the door leaf and when the pin is in engagement this cannot be disengaged until the door is closed. This is mostly achieved by designing the pin as what is known as a mushroom pin with a thicker section at one end. Modern door gap locks make provision that, for actuation of the door gap lock, the pin is arranged to be shifted axially and can be moved via an actuation apparatus, such as a rotary knob. The pivot lever is often arranged sunk into the door frame in such cases and does not have to be touched to actuate the door gap lock. This form of design makes optically more attractive door gap locks possible, because only the actuation apparatus is visible. In general, door gap locks are such massive designs that they cannot be overcome by bodily force and simple tools. In emergencies, when a door absolutely must be opened, a destruction of the door can even come into play. If door gap locks are used in means of public transport, such as in compartment doors of rail vehicles, then the waiting time for rescue services may possibly be too long, so that in an emergency an opening of the door can be undertaken despite the door gap lock still being engaged. For this purpose, tools can be carried in the means of transport, for example, which, when used, will destroy the door gap lock and mostly also the door leaf or the door frame. With the conventional door gap locks, an emergency opening without damaging the door leaf, the door frame and significant parts of the door gap lock itself cannot be ensured.

SUMMARY OF THE INVENTION

In view of the foregoing, it is therefore an object of the invention to provide a door gap lock that can be overcome by exertion of a force, but when this is done however no damage to a door leaf, a door frame or the door gap lock itself may occur and only parts of the door gap lock that are easily replaceable may be damaged.

This and other objects and advantages are achieved in accordance with the invention by a door gap lock comprising a door leaf part structured to be arranged on a door leaf with an axially slidably mounted locking bolt and a frame part formed to be arranged on a door frame with a rotationally mounted pivot lever, where the locking bolt can be slid into a guide on the pivot lever and, during a relative movement between the door leaf part and the frame part, the locking bolt is guided into this guide in a form-fitting manner so as to be slidable therein over a defined distance, and where the guide, as arranged in the pivot lever, has a predetermined break point at which the locking bolt breaks through the guide when a specific force is applied to the locking bolt.

This enables the benefit of being able to overcome the door gap lock to be achieved without significant components of the door gap lock or components connected to the door gap lock, in particular a door leaf or a door frame, being damaged.

In accordance with the invention, the door gap lock is constructed from a door leaf part, a fitting part configured to be attached to the door and a frame part configured to be attached to a door frame.

Arranged in the door leaf part is an axially slidable locking bolt, which with a suitable actuation facility, such as a rotary or sliding knob, can be moved between two end positions. The locking bolt, in this case, is arranged in or parallel to the plane of the door leaf and in its first unlocked end position is completely withdrawn and does not project into further components. In the second locked end position, the locking bolt is extended and projects from the door leaf part.

The frame part comprises a pivot lever, which is arranged to be pivoted by a certain angle on a base body of the frame part, where the pivot axis of the pivot lever is aligned horizontally in a fitted position of the frame part. The pivot lever comprises a guide facing towards the door leaf part, for example, a slot with a T-shaped cross section.

In the installed position of the frame and the leaf parts, the components are aligned in relation to one another so that the locking bolt, in an extended second end position, engages in the guide. To this end, an opening is to be arranged in the guide, in which the locking bolt, with the door leaf closed, can move unimpeded into the guide of the pivot lever. If the door leaf is opened when the locking lever is extended as such, then the locking bolt moves along the guide in the pivot lever and the pivot lever pivots about its pivot axis. In this case, the locking bolt engages in the guide in a form-fit manner.

It is especially recommended that the locking bolt be structured as what is known as a mushroom pin, which has a round cross section with a narrowing along the longitudinal extent, because in such a way a double undercut with a T-shaped guide in the pivot lever and thus a good transmission of force between the locking bolt and the frame part is made possible.

Other forms of embodiment, such as a hook-shaped locking bolt, are likewise possible.

The locking bolt is slidable in the guide and reaches an end position in the guide at which the door leaf is blocked at a maximum locked opening angle. This opening angle can be determined from the dimensions of the door leaf, the maximum pivot angle of the pivot bolt and the distance of the end position in the guide from the door leaf plane.

In this end position, the door leaf cannot be opened further and also the locking bolt can no longer be withdrawn due to the form-fit guidance in the pivot lever. For complete opening of the door, this must first be closed and subsequently the locking bolt moved into its first, withdrawn end position. An opening of the door without carrying out these steps beforehand is only possible while accepting significant damage to components of the door leaf lock or the door leaf or the door frame.

In accordance with the invention, the door gap lock is therefore equipped with a predetermined breaking part, which fails with a specific force acting on it and releases the locking bolt, so that the door can be opened even with locking bolt extended, located in its second end position and in this case only the predetermined breaking point is destroyed. This predetermined breaking point, which is arranged on the pivot lever so that it can become effective at the end of the intended movement section of the locking bolt in the guide, thus delimits this guide and in its turn forms a part of the guide.

After the predetermined breaking point is reached, a rapid recommissioning of the door gap lock is to be possible. As a result, it is advantageous to form the predetermined breaking point as a component attached releasably to the pivot lever. In such a way, the predetermined breaking point can be rapidly repaired and the door leaf or frame parts can remain installed.

It is advantageous to form the predetermined breaking point as a sheet metal flexible part, because such a part is, on the one hand, simple to manufacture and, on the other hand, when the predetermined breaking point is reached a bending process occurs, during which no fragments are released. The predetermined breaking point formed in this way closes off the guide at that one of its ends, upon which the locking bolt rests when the door leaf is locked and prevents a movement of the locking bolt beyond this. If a correspondingly large force is now exerted on the door leaf, then this acts via the locking bolt on the predetermined breaking point, which bends and releases the locking bolt from the slot. The force required for can be set by the choice of material, the thickness of the sheet metal flexible part and the shape in a further area. The force to be employed for opening is to be dimensioned for the application concerned, but in any event so that during usual use the predetermined breaking point is not activated.

In a further embodiment of the invention, the predetermined breaking point is formed as an injection molded part, in particular as a metal molded part. This enables other forms to be manufactured than via flexible sheet metal, but accepting fragments when broken.

In principle it is possible to equip the locking bolt with a predetermined breaking point and to achieve the function of the inventive door gap lock by breaking the locking bolt at a specific shear force acting on it. This is disadvantageous, because a locking bolt is significantly more complicated to replace than a predetermined breaking point along the course of the guide on a pivot lever and fragments unavoidably occur with the separated piece of the locking bolt.

In accordance with the embodiments of the invention, the predetermined breaking point is to be connected releasably to the pivot lever, which can advantageously be achieved via a screw connection. In such a way, an activated predetermined breaking point can be replaced very quickly and with the aid of simple tools. This is very advantageous in mode of transport, for example, because with this a rapid restoration of service can be achieved. If the inventive door gap lock is employed in a passenger coach, especially in a sleeping compartment coach, after a door gap lock is triggered this can be put back into operation very quickly by the operating personnel and the coach or the compartment concerned does not have to be taken out of operation for maintenance.

In a further embodiment of the invention, it is advantageous to provide a facility for detecting a break of a predetermined breaking point. An activation of a predetermined breaking point is only possible by application of a force. Consequently, this should only be done in exceptional cases. In particular it should be possible for the operating personnel of a mode of transport to detect a triggering, because this can be connected with unauthorized behavior, such as a break in.

To detect a break, i.e., the triggering of the predetermined breaking point, it is advantageous to lay an electrical or optical cable so that, when the predetermined breaking point is destroyed, this is necessarily also interrupted. This interruption can consequently be forwarded as an alarm signal to the operating personnel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the invention will now be explained with reference to the accompanying drawings, in which.

DETAILED DESCRIPTION OF THE EXEMPLARY EMBODIMENTS

Figure 1:
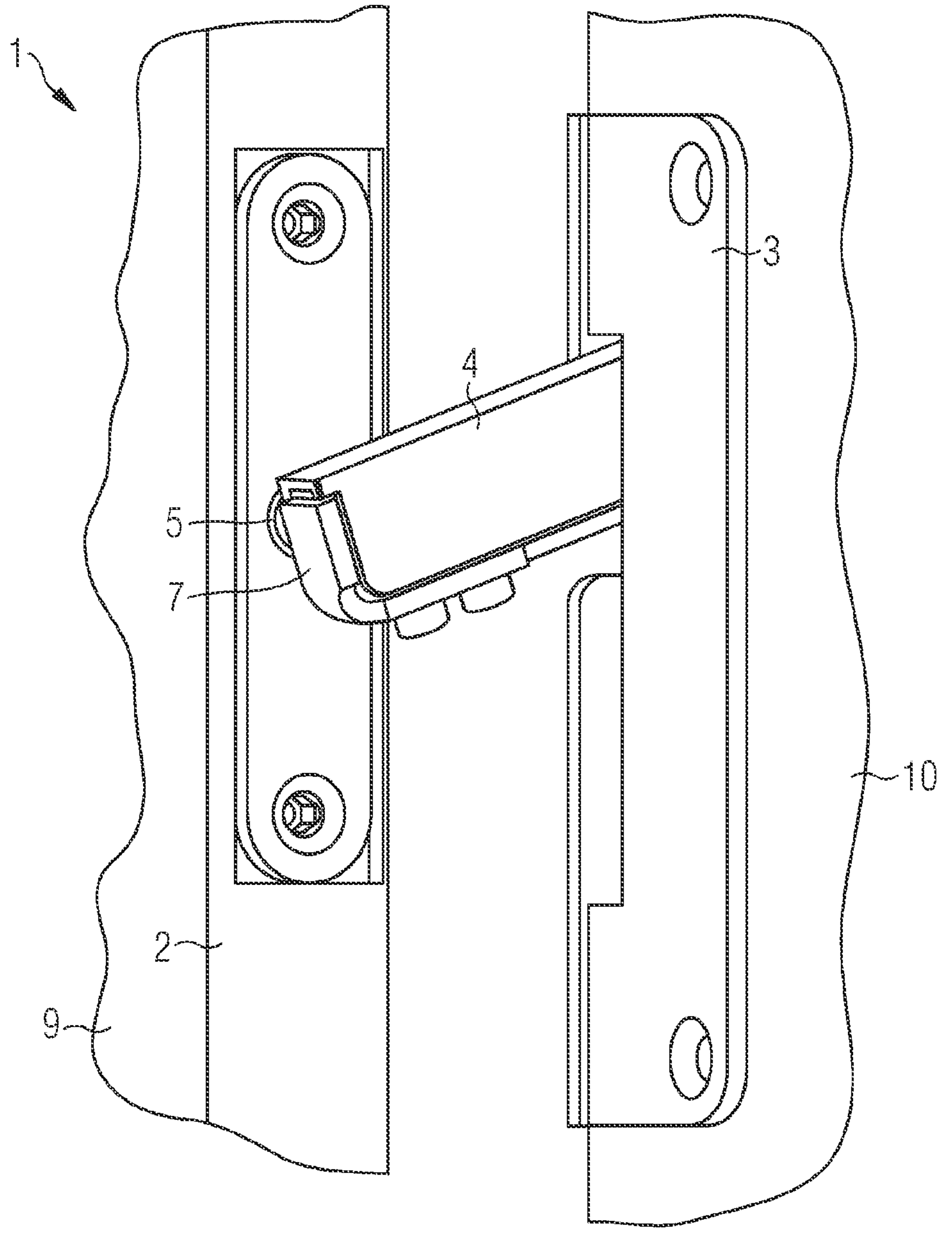
FIG. 1 is a view of the opening side of a door gap lock in accordance with the invention.

FIG. 1 shows by way of example and schematically a door gap lock in a view of the opening side. A door gap lock 1 is shown in the installed state, which comprises a door leaf part 2 attached to a door leaf 9 and a frame part 3 attached to a door frame 10. The door gap lock 1 is shown from the opening side of the door, from which side the door gap lock 1 is usually operated, i.e., the locking bolt 5 is slid axially. Also located on this side is the actuation apparatus of the door gap lock 1, this is not shown in FIG. 1, however. The frame part 3 comprises a pivot lever 4 supported pivotably on a base body of the frame part 3, which at its resting position is arranged sunken in the base body of the frame part 3 and can be held elastically in this rest position via a withdrawal apparatus, for example, a spring. FIG. 1 shows the door gap lock in a use position, in which the door leaf 9 is opened by a specific angle but cannot be opened any further. To this end, the locking bolt 5 is extended and engages in the pivot lever 4, which comprises a guide for this purpose. Through the opening of the door leaf 9, the pivot lever 4, engaging in a form-fit manner with locking bolt 5, is pivoted out from its rest position and, when this is done, assumes a pivot angle, which is calculated from the geometry of the component (the height offset between the locking bolt 5 and the length of the pivot lever 4). In this use position of the door gap lock 1 shown in FIG. 1, the locking bolt 5 comes into contact with the end of the guide 6 and can transfer a force to this end of the guide 6 (see FIG. 2). Arranged at this position, at the end of the guide 6 in the pivot lever 4, is a predetermined breaking point formed as a sheet metal flexible part 7. The sheet metal flexible part 7 is dimensioned so that, when a force is exerted on it by the locking bolt 5, it deforms so that the locking bolt 5 can slide out of the guide 6 and it releases the locking bolt 5 and the door leaf 9 connected to it. The force required for this must be smaller than that force at which the further components of the door gap lock 1, the door leaf 9, the door frame 10 and especially the means of attachment for arrangement of the door gap lock 1 on the door leaf 9 or the door frame 10.

Figure 2:
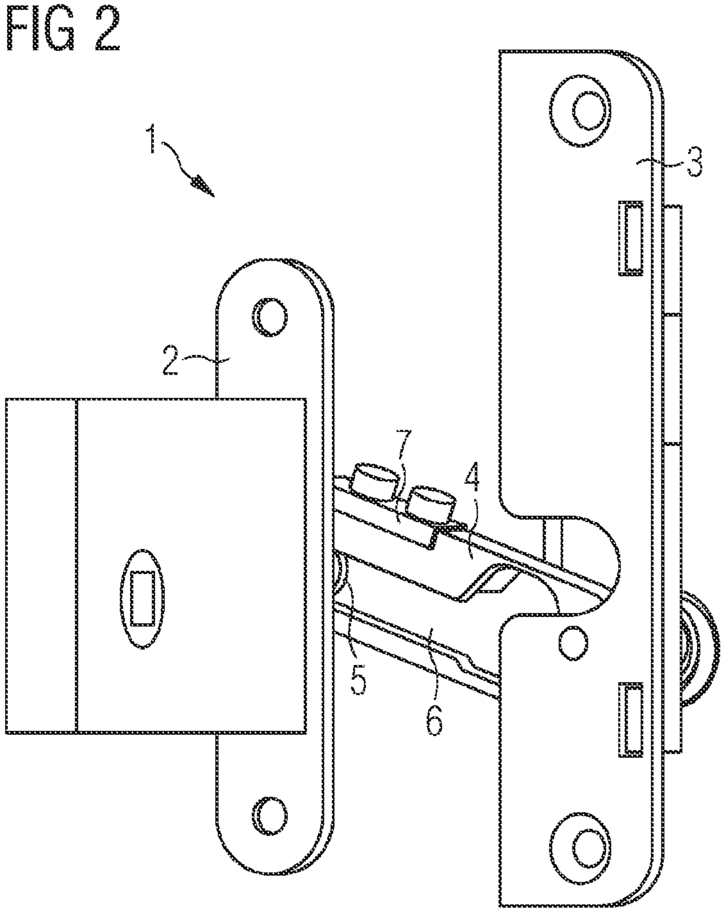
FIG. 2 is a view of the closing side of a door gap lock in accordance with the invention.

FIG. 2 shows by way of example and schematically a door gap lock in a view of the closing side. The door gap lock 1 from FIG. 1 is shown in the locked position and with the door leaf open. In this view, the guide 6 arranged in the pivot lever is visible, into which the locking bolt 5 engages. The guide 6, at the end facing towards the axis of rotation of the pivot lever 4, has an opening, into which the locking bolt 5 in the guide 6 in the rest position of the door gap lock 1 can be pushed unimpeded.

Figure 3:
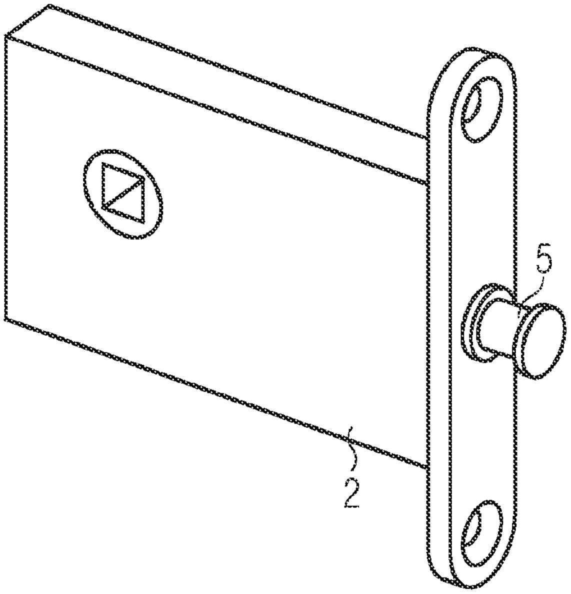
FIG. 3 is view of a door leaf part in accordance with the invention.

FIG. 3 shows by way of example and schematically a door leaf part. A door leaf part 2 with a completely extended locking bolt 5 is shown. The locking bolt is formed in the exemplary illustrated embodiment as a mushroom pin.

Figure 4:
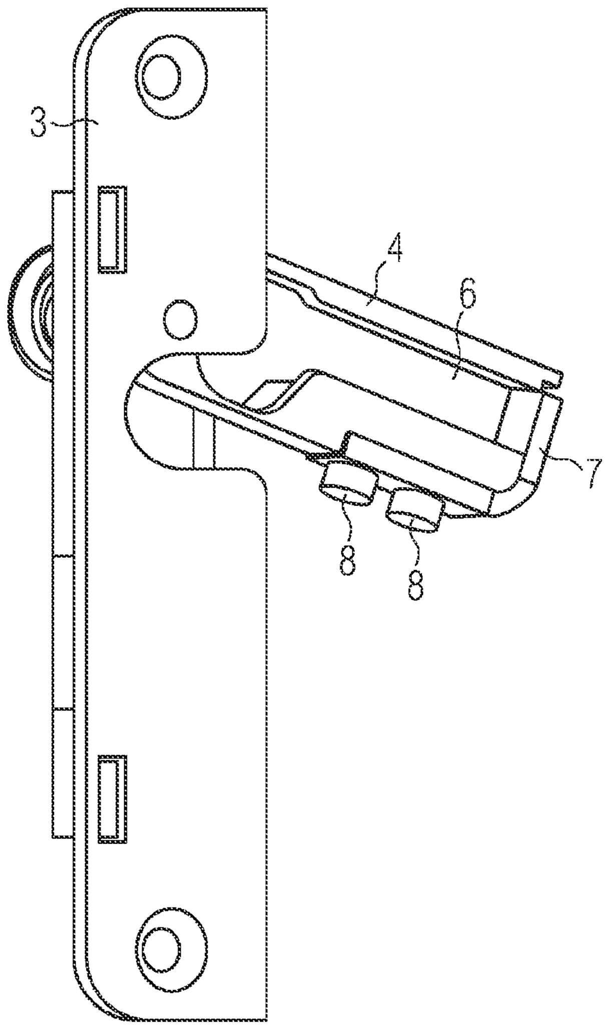
FIG. 4 is a view of a frame part in accordance with the invention.

FIG. 4 shows by way of example and schematically a frame part. The frame part 3 from the exemplary embodiment illustrated in FIG. 1 with the pivoted-out pivot lever 4 is shown. Here, the guide 6 arranged in the pivot lever 4 with the opening for pushing in a locking bolt and the predetermined breaking point is visible. Here, the guide 6 is open at its end facing away from the axis of rotation or the pivot lever 4, so that a locking bolt guided in it can slide out at this point from the pivot lever 4 but is prevented from doing so by the predetermined breaking point. The predetermined breaking point is formed as a sheet metal flexible part 7 and is connected releasably to the pivot lever 4 via two screw connections 8.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A door gap lock, comprising:

a door leaf part configured for arrangement on a door leaf;

an axially slidably supported locking bolt;

a frame part configured for arrangement on the door frame;

a pivot lever supported for rotational movement and including a predetermined breaking part formed as a component releasably attached at an end of the pivot lever, the locking bolt being pushable in a guide in the pivot lever and, with a relative movement between the door leaf part and the frame part, being guided in a form-fitting manner in the guide and slidable therein over a defined distance;

wherein the guide when arranged in the pivot lever has a predetermined break point at which the locking bolt breaks through the guide when a specific force is exerted on the locking bolt.

2. The door gap lock as claimed in claim 1, wherein the predetermined breaking part is arranged at an end of a movement section of the locking bolt provided in the guide.

3. The door gap lock as claimed in claim 2, wherein the predetermined breaking part is formed as a component releasably attached to the pivot lever.

4. The door gap lock as claimed in claim 1, wherein the predetermined breaking part is formed as a sheet metal flexible part which, when a specific force is exerted on the locking bolt, bends to allow the locking bolt to leave the guide.

5. The door gap lock as claimed in claim 1, wherein the predetermined breaking part comprises a molded metal part which breaks when a specific force is exerted on the locking bolt.

6. The door gap lock as claimed in claim 1, further comprising:

a facility arranged on the frame part, said facility detecting the breakage of the predetermined breaking part.

7. The door gap lock as claimed in claim 6, wherein the facility for detecting the breakage of the predetermined breaking part comprises an electrical or optical cable which is interrupted when the predetermined breaking part is broken.

* * * * *